(12) United States Patent
Hammadou

(10) Patent No.: US 8,508,607 B2
(45) Date of Patent: Aug. 13, 2013

(54) METHOD AND SYSTEM FOR A PROGRAMMABLE CAMERA FOR CONFIGURABLE SECURITY AND SURVEILLANCE SYSTEMS

(75) Inventor: Tarik Hammadou, Surry Hills (AU)

(73) Assignee: ITS-7, Sydney (AU)

( * ) Notice: Subject to any disclaimer, the term of this patent is extended or adjusted under 35 U.S.C. 154(b) by 1837 days.

(21) Appl. No.: 11/219,951

(22) Filed: Sep. 6, 2005

(65) Prior Publication Data

US 2007/0052809 A1    Mar. 8, 2007

(51) Int. Cl.
*H04N 5/232* (2006.01)

(52) U.S. Cl.
USPC ............... 348/211.3; 348/211.4; 348/211.11

(58) Field of Classification Search
USPC ..................................... 348/211.3, 143–160
See application file for complete search history.

(56) References Cited

U.S. PATENT DOCUMENTS

| | | | |
|---|---|---|---|
| 5,467,286 A | 11/1995 | Pyle | |
| 5,594,842 A | 1/1997 | Kaufman et al. | |
| 5,627,583 A * | 5/1997 | Nakamura et al. | 348/72 |
| 5,666,157 A | 9/1997 | Aviv | |
| 6,064,303 A | 5/2000 | Klein et al. | |
| 6,151,657 A * | 11/2000 | Sun et al. | 711/103 |
| 6,414,716 B1 * | 7/2002 | Kawai | 348/211.3 |
| 6,525,761 B2 * | 2/2003 | Sato et al. | 348/14.04 |
| 6,646,676 B1 | 11/2003 | DaGraca et al. | |
| 7,219,365 B2 * | 5/2007 | Sato et al. | 725/105 |
| 7,350,224 B2 * | 3/2008 | Creamer et al. | 725/105 |
| 7,423,670 B2 * | 9/2008 | Kawai et al. | 348/211.99 |
| 2002/0111698 A1 * | 8/2002 | Graziano et al. | 700/17 |
| 2002/0171741 A1 * | 11/2002 | Tonkin et al. | 348/211.3 |
| 2003/0014673 A1 * | 1/2003 | Baum et al. | 713/202 |
| 2003/0051160 A1 | 3/2003 | Selkirk | |

(Continued)

FOREIGN PATENT DOCUMENTS

| | | |
|---|---|---|
| CN | 1588312 | 3/2005 |
| EP | 2369904 | 6/2002 |

(Continued)

OTHER PUBLICATIONS

H. Pan, P. Van Beek and M. I. Sezan, *Detection of Slow-Motion Replay Segments in Sports Video for Highlights Generation*, IEEE 2001, pp. 135-140.

(Continued)

*Primary Examiner* — Sinh Tran
*Assistant Examiner* — Christopher K Peterson
(74) *Attorney, Agent, or Firm* — McAndrews, Held & Malloy, Ltd.

(57) ABSTRACT

A method and system for a programmable camera for a configurable security and surveillance system are provided. A programmable sensor agent for video surveillance may comprise a network interface, a processor, an image processor, and an image sensor. The image processor may comprise at least one configurable device. A device programming file may be received by the network interface from a system manager and may be programmed into at least one configurable device in the image processor via a JTAG interface in the processor. The processor may also verify that the programming has been completed successfully. The programmable sensor agent may also comprise a display interface. The device programming file may be selected via the system manager and/or via the display interface in the programmable sensor agent. The programmable sensor agent may also comprise a battery for backup power, a wireless processor, and/or a global positioning system (GPS) processor.

29 Claims, 14 Drawing Sheets

(56) References Cited

U.S. PATENT DOCUMENTS

| | | | |
|---|---|---|---|
| 2003/0067387 A1* | 4/2003 | Kwon et al. | 340/540 |
| 2003/0197789 A1* | 10/2003 | Coffland | 348/211.3 |
| 2004/0095506 A1 | 5/2004 | Scott | |
| 2004/0183903 A1* | 9/2004 | Pedersen | 348/143 |
| 2004/0184529 A1 | 9/2004 | Henocq et al. | |
| 2004/0215750 A1* | 10/2004 | Stilp | 709/220 |
| 2005/0007479 A1 | 1/2005 | Ahiska | |
| 2005/0028215 A1 | 2/2005 | Ahiska | |
| 2005/0134695 A1* | 6/2005 | Deshpande | 348/211.3 |
| 2005/0138401 A1 | 6/2005 | Terao et al. | |
| 2005/0289274 A1* | 12/2005 | Ghercioiu et al. | 710/303 |

FOREIGN PATENT DOCUMENTS

| | | |
|---|---|---|
| EP | 1447781 | 8/2004 |
| EP | 1519314 | 3/2005 |
| GB | 2369904 A * | 6/2002 |
| JP | 2004180190 | 6/2004 |
| WO | WO 99/42924 | 8/1999 |
| WO | WO 99/44360 | 9/1999 |

OTHER PUBLICATIONS

Yap-Peng Tan, Drew D. Saur, Sanjeev R. Kulkarni, *Rapid Estimation of Camera Motion from Compressed Video with Application to Video Annotation*, IEEE Transactions on Circuits and Systems for Video Technology, Feb. 2000, pp. 133-146, vol. 10, No. 1.

Vikrant Kobla, Daniel DeMenthon, David Doermann, *Detection of Slow-Motion Replay Sequences for Identifying Sports Videos*, Proc. IEEE Workshop on Multimedia Signal Processing, 1999, pp. 135-140.

ISO/IEC JTC1/SC29/WG11/N2861, "MPEG-7 Applications Document v.9," Jul. 1999, pp. 1-36.

Yap-Peng Tan, Sanjeev R. Kulkarni, Peter J. Ramadge, *A New Method for Camera Motion Parameter Estimation*, Proc. IEEE International Conference on Image Processing, vol. 2, 1995, pp. 722-726.

International Preliminary Report on Patentability corresponding to International Application No. PCT/AU2006/001277, mailed Mar. 20, 2008, 6 pages.

Extended European Search Report corresponding to European Patent Application Serial No. 06774906.9-1243, dated Dec. 17, 2008.

Chinese communication dated Jun. 30, 2010 in Chinese Application No. 2006800321186.

The State Intellectual Property Office of P.R. China, The Notification of the Second Office Action, in Chinese application No. 2006800321186, dated Apr. 27, 2011.

European Patent Office, Communication with extended European search report, in Application No. 11002504.6, dated Sep. 29, 2011 (6 pages).

European Patent Office, Communication pursuant to Article 94(3) EPC, in Application No. 06774906.9-2221 dated Nov. 11, 2011 (5 pages).

European Patent Office, Communication pursuant to Rule 69 EPC, in Application No. 11002504.9-2221, dated Oct. 31, 2011 (2 pages).

* cited by examiner

METHOD AND SYSTEM FOR A PROGRAMMABLE CAMERA FOR CONFIGURABLE SECURITY AND SURVEILLANCE SYSTEMS

CROSS-REFERENCE TO RELATED APPLICATIONS/INCORPORATION BY REFERENCE

Not applicable.

FIELD OF THE INVENTION

Certain embodiments of the invention relate to security systems. More specifically, certain embodiments of the invention relate to a method and system for a programmable camera for configurable security and surveillance systems.

BACKGROUND OF THE INVENTION

The use of security and surveillance systems is becoming more widespread in modern society. In addition to providing security measures that protect assets and individuals in commercial, residential, and public settings, security and surveillance systems are also being adapted to improve the efficiency and versatility of processes and/or procedures in a variety of businesses. One important aspect of security and surveillance systems is the need for upgrade and/or maintenance operations. This is a necessary but generally cumbersome and costly aspect of providing security measures. Moreover, a great number of new security and surveillance applications may be implemented utilizing wireless technology that supports mobile security. This presents an even bigger challenge in terms of upgrade and/or maintenance operations given that cameras, sensors, and/or other equipment utilized by the security and surveillance system may be spread out over a wide geographic area. Many of the cameras and/or sensors, for example, may be operated as mobile devices and may therefore change locations. In some instances, providing upgrade and/or maintenance operations to a mobile security and surveillance system may result in reduced protection as certain portions of the system may need to be disabled while the upgrade and/or maintenance operation takes place.

Security and surveillance operations may require security management systems that are capable of providing either a single security function or, in some instances, a wide range of integrated security functions. Most security management systems, however, are designed to operate as autonomous systems that provide a single security function such as intrusion detection, access control, or audio and/or video surveillance and recording, for example. These security management systems may not generally support the addition of other security functions and/or the addition of other features to an existing security function without a substantial investment in hardware and/or software. As a result, multiple security management systems are generally utilized when a particular application requires multiple security functions. In this regard, any integration that may be necessary to efficiently and/or effectively operate multiple security management systems is typically left to an installer, an integrator, and/or the customer to carry out.

One of the needs driving security management systems capable of supporting a wide range of integrated security functions and/or features are security operations for large government agencies as well as large corporate entities. Corporate or governmental entities may have many different security requirements extending over multiple locations. A centrally monitored integrated security management system allows system administrators or controllers at a central control center to efficiently oversee the many security activities that are supported at remote facilities.

The limited ability of most security management systems to add security functions, to add features to existing security functions, and/or to easily integrate with other security management systems with complementary security functions generally results in an inefficient use of available resources. For example, multiple security management systems that have not been efficiently integrated may have multiple data entry points and/or duplicate databases. Moreover, limited integration capability may also create inefficient use of personnel by duplicating data entry tasks, requiring manual data exchange between systems, and implementing multiple training requirements for the various systems being utilized. Moreover, even when integration between multiple security management systems has been effectively implemented, continued compatibility may be lost when hardware and/or software on various portions of at least one of the multiple security management systems is upgraded.

A common security function that may need to be provided with either additional features or that may need to be compatible with other security functions is video surveillance. Most video surveillance operations are provided by stand-alone closed circuit television (CCTV) systems that are commonly found in, for example, office buildings, external structures, schools, railway stations, and even on city streets. An effective integrated security management systems may require that a CCTV system be compatible with other security functions such as access control methods augmented with biometrics, security tracking systems, and/or access tracking systems, for example. Moreover, video content analysis may be utilized to add additional security features to video surveillance. However, most CCTV systems and their components are not easily upgradable nor are they easily integrated with other security functionality. As a result, integrated security management systems comprising video surveillance operations are not readily available. Moreover, the ability of these integrated security management systems to evolve and provide further security functions and/or additional features are generally limited or may be accomplished only with a substantial investment in hardware and/or software.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a programmable camera for configurable security and surveillance systems, substantially as shown in and/or described in connection with at least one of the drawings, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a programmable camera for a configurable security and surveillance system. In accordance with an embodiment of the invention, a programmable sensor agent for video surveillance may comprise a network interface, a processor, an image processor, and an image sensor. The image processor may comprise at least one configurable device. A device programming file may be received by the network interface from a system manager and may be programmed into at least one configurable device in the image processor via a JTAG interface in the processor. The processor may also verify that the programming has been completed successfully. The programmable sensor agent may also comprise a display interface. The device programming file may be selected via the system manager and/or via the display interface in the programmable sensor agent. The programmable sensor agent may also comprise a battery for backup power, a wireless processor, and/or a global positioning system (GPS) processor. Note that the following discussion will generally use the terms "configuration" and "programming" interchangeably. Accordingly, the scope of various aspects of the present invention should not be limited by notions of difference between the terms "configuration" and "programming."

Figure 1A:
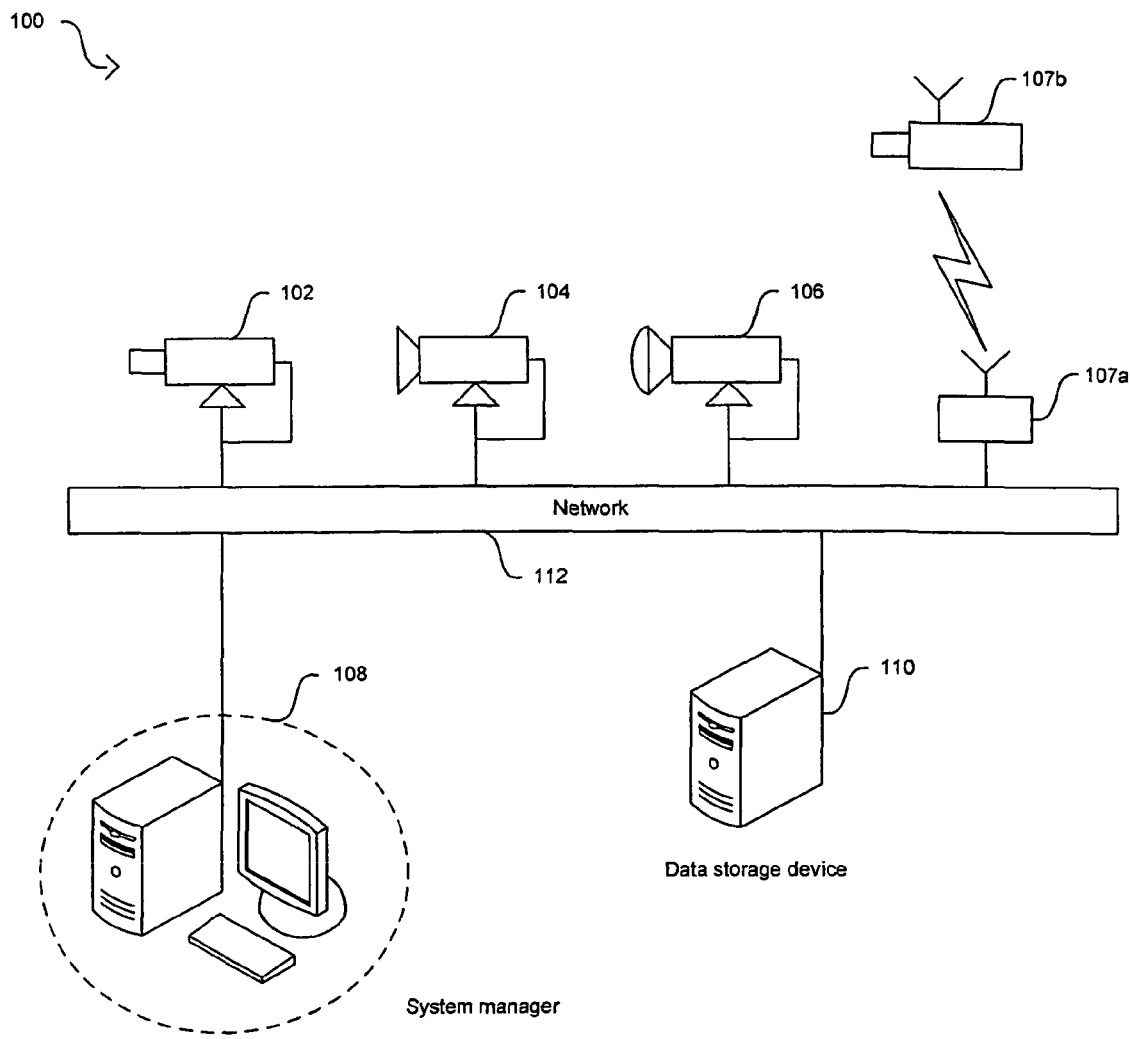
FIG. 1A illustrates an exemplary configurable security and surveillance system with programmable sensor agents, in accordance with an embodiment of the invention.

FIG. 1A illustrates an exemplary configurable security and surveillance system with programmable sensor agents, in accordance with an embodiment of the invention. Referring to FIG. 1A, there is shown a configurable security and surveillance system 100 that comprises a first programmable sensor agent 102, a second programmable sensor agent 104, a third programmable sensor agent 106, a system manager 108, a data storage device 110, a network 112, a wireless hub 107a, and a wireless programmable sensor agent 107b. The configurable security and surveillance system 100 need not be limited to the implementation described in FIG. 1A.

The network 112 may comprise suitable logic, circuitry, and/or code that may be adapted to communicatively couple a plurality of components, devices, and/or elements. In this regard, the components, devices, and/or elements coupled to the network 112 may correspond to specified network address and/or network locations in the network 112. The network 112 may be a communication network that may be implemented as a local area network (LAN), a wide area network (WAN), a campus area network (CAN), a metropolitan area network (MAN), and/or a home area network (HAN), for example. The network 112 may be, for example, a transport control protocol/Internet protocol (TCP/IP) network, but need not be so limited. In some instances, at least portions of the network 112 may be implemented as wireless connections while remaining portions may be implemented as wireline connections. Moreover, components communicatively coupled to the network 112 may be coupled via wireline or wireless connections, for example.

The first programmable sensor agent 102, the second programmable sensor agent 104, the third programmable sensor agent 106, and the wireless programmable sensor agent 107b may comprise suitable logic, circuitry, and/or code that may be adapted to detect a physical event, generate at least one signal that corresponds to the physical event detected, and transfer the generated signal to the data storage device 210 and/or the system manager 208 via the network 112. These different types of programmable sensor agents are shown in FIG. 1A as examples to indicate that a plurality of programmable sensor agent types may be utilized to detect different physical events. As a result, the types and the number of programmable sensor agents may depend on the security functions that need to be integrated in the configurable security and surveillance system 100. For example, a programmable sensor agent may correspond to a surveillance camera, a thermal sensor, or a biological/chemical sensor. In the example illustrated in FIG. 1A, each of the programmable sensor agents 102, 104, 106, and/or 107b may be associated with a specified network address in the network 112.

A programmable sensor agent may be adapted to receive control information from the system manager 108 via the network 112. Moreover, a programmable sensor agent may be adapted to be programmed or configured by the system manager 108. In this regard, the programming or configuration may be performed to add and/or remove features that correspond to a security function or functions performed by a programmable sensor agent. The programming or configuration may be performed dynamically, that is, while the configurable security and surveillance system 200 is in operation. In other instances, the programming or configuration may be performed during installation or during maintenance periods when at least a portion of the configurable security and surveillance system 200 is not in operation. The programmable sensor agents may comprise configurable devices, such as processors, application specific integrated circuits (ASICs), field programmable gate arrays (FPGAs), complex programmable logic devices (CPLD), for example. Configuration and/or programming of a programmable sensor agent may comprise configuring and/or programming at least a portion of a configurable device in the programmable sensor agent. When a programmable sensor agent utilizes more than one configurable device, the configuration and/or programming of a programmable sensor agent may comprise the configuration and/or programming of at least one of the configurable devices in the programmable sensor agent.

When a programmable sensor agent is a surveillance video camera, for example, it may comprise suitable logic, circuitry, and/or code that may be adapted to capture video information and transfer video information to the network 112. The surveillance camera may be adapted to receive control information via the network 112. The surveillance camera may comprise an image sensor, an image/color processor, and a compression engine. The image sensor may be, for example, a complementary metal-oxide-semiconductor (CMOS) image sensor or a charge-coupled device (CCD) image sensor and may be adapted to capture video information. The image processor may be, for example, a digital signal processor (DSP) or a dedicated application specific integrated circuit (ASIC) and may be adapted to perform front-end processing of the video information captured by the image sensor such as, for example, color processing. The compression engine may comprise suitable logic, circuitry, and/or code that may be adapted to encode the processed video information before transfer to the network 112. The control information received by the surveillance video camera may be utilized to control, for example, zoom, tilt, and/or pan operations.

The wireless hub 107a may comprise suitable logic, circuitry, and/or code that may be adapted to provide wireless communication between the wireless programmable sensor agent 107b and the network 112. In this regard, the wireless hub 107a may be adapted to support at least one wireless communication protocol, such as IEEE 802.11 wireless local area network (WLAN), global system for mobile communication (GSM), and/or Bluetooth, for example. In some instances, the wireless hub 107a may be adapted to wirelessly communicate with more than one wireless programmable sensor agent 107b. The wireless programmable sensor agent 107b may comprise suitable logic, circuitry, and/or code that may be adapted to communicate wirelessly with the wireless hub 107a. In this regard, the wireless programmable sensor agent 107b may be adapted to support at least one of the wireless communication protocols supported by the wireless hub 107a.

The data storage device 110 may comprise suitable logic, circuitry, and/or code that may be adapted to store at least a portion of the signals generated by the programmable sensor agents. In some instances, the data storage device 110 may be part of a network attached storage (NAS) and/or a storage area network (SAN), for example. The data storage device 110 may correspond to a specified network address in the network 112. In some instances, more than one data storage device 110 may be utilized in the configurable security and surveillance system 100.

The system manager 108 may comprise suitable logic, circuitry, and/or code that may be adapted to control the operation of at least one of the programmable sensor agents in the configurable security and surveillance system 100. In this regard, the system manager 108 may generate control information that may be transferred to the programmable sensor agents via the network 112. The system manager 108 may also be adapted to display at least a portion of the information in the signals generated by the programmable sensor agents.

Moreover, the system manager 108 may receive information stored in the data storage device 110 and may process and/or display the information received from the data storage device 110. The system manager 110 may correspond to a specified network address in the network 112.

The system manager 108 may also be adapted to program or configure security features into the programmable sensor agents in the configurable security and surveillance system 100. In this regard, the system manager may receive device programming files that may be utilized to program or configure a portion of the programmable sensor agents in order to provide new, additional, and/or upgraded security features. The device programming files may be transferred to the corresponding programmable sensor agents via the network 112. In some instances, the device programming files received by the system manager 108 may be encrypted or protected. When the device programming files are encrypted, the system manager 108 may receive at least one decryption key or password that may be utilized to decrypt the encrypted device programming files or to gain access to the device programming files. In this regard, encryption and protection may be substantially similar restrictions on the device programming files that they may be referred to interchangeably. When the device programming files have been decrypted, the system manager 208 may transfer the device programming files to the corresponding programmable sensor agents via the network 112.

The system manager 108 may also be adapted to execute code or software that may be adapted to perform control, management, and/or maintenance operations that may be utilized in the operation and/or the configuration of the configurable security and surveillance system 100.

In operation, the system manager 108 may transfer a device programming file associated with a security measure or feature to a specified programmable sensor agent via the network 112 in accordance with an upgrade and/or maintenance schedule. In some instances, a user may transfer a device programming file to a specified programmable sensor agent via the system manger 108 at times other than those provided in an upgrade and/or maintenance schedule. After programming is completed and the specified programmable sensor agent has been properly configured, the system manager 108 may update any table and/or database that indicate the current features being supported by the programmable sensor agents. In this regard, the system manager 108 may keep a detailed listing of all relevant information regarding the features, upgrades, configurations, and/or maintenance provided to programmable sensor agents in the security and surveillance system 100.

Information generated by the programmable sensor agents may be transferred to the data storage device 110 via the network 112 for storage. The data storage device 110 may categorize, order, arrange, convert, and/or manipulate the data received to provide more efficient storage and search capabilities. The system manager 108 may access, via the network 112, information stored in the data storage device 110 for display and/or processing.

Figure 1B:
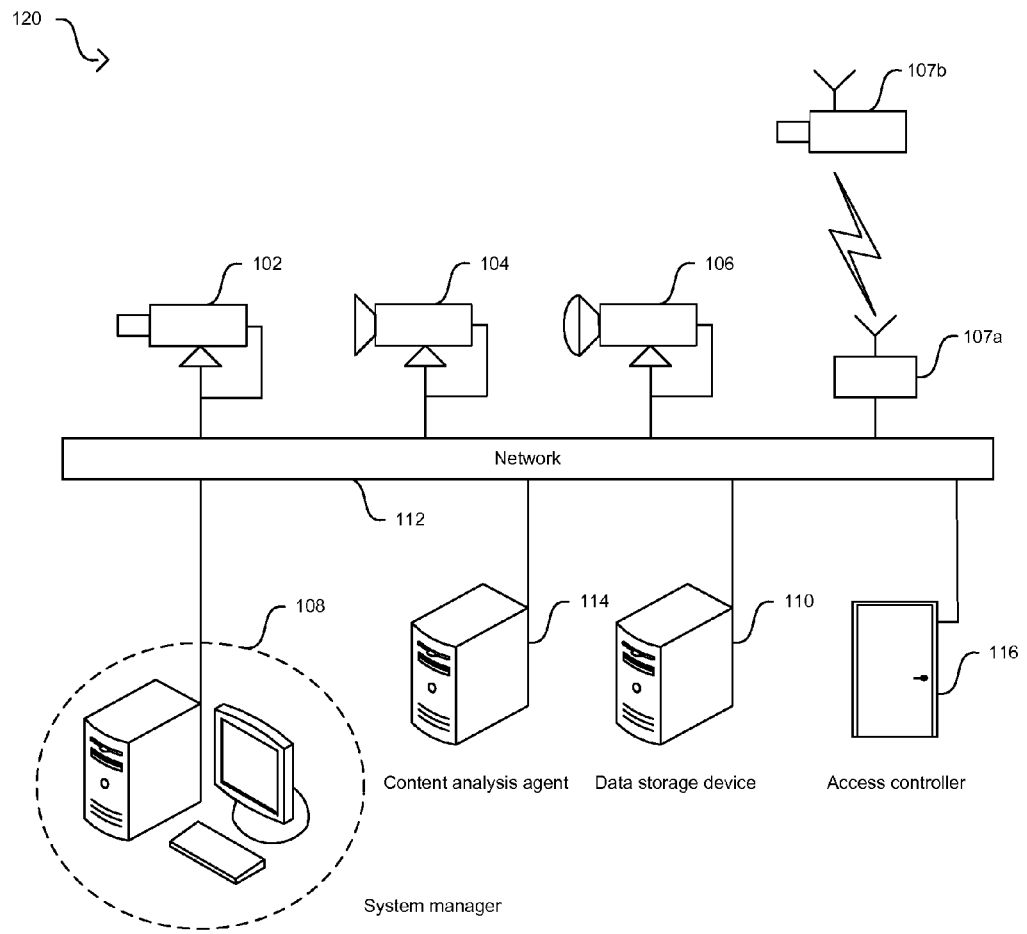
FIG. 1B illustrates an exemplary configurable security and surveillance system with programmable sensor agents and a programmable content management and analysis agent, in accordance with an embodiment of the invention.

FIG. 1B illustrates an exemplary configurable security and surveillance system with programmable sensor agents, a programmable content management and analysis agent, and an access controller, in accordance with an embodiment of the invention. Referring to FIG. 1B, there is shown a configurable security and surveillance system 120 that differs from the configurable security and surveillance system 100 in FIG. 1A in that a programmable content analysis agent 114 and an access controller 116 are shown communicatively coupled to the network 112.

The programmable content analysis agent 114 may comprise suitable logic, circuitry, and/or code that may be adapted to perform sensor analysis operations and/or security analysis operations. For example, sensor analysis operations may comprise, but need not be limited to, processing sensor information, classifying sensor information, and/or generating control information that may be transferred to other programmable sensor agents in the configurable security and surveillance system 120. Security analysis operations may comprise, but need not be limited to, identifying security anomalies, managing emergency situations, providing access control, and/or triggering alarms, for example. The results of sensor analysis operations may be utilized to generate and/or add information to a comprehensive knowledge base that may be utilized by, for example, the security analysis operations. In this regard, the programmable content analysis agent 114 may store at least a portion of the results generated by the sensor analysis operations. Storage of the results generated by the sensor analysis operations may be local on the programmable content analysis agent 114 and/or on the data storage device 110. The programmable content analysis agent 114 may correspond to a specified network address in the network 112. In some instances, more than one programmable content analysis agent 114 may be utilized by the configurable security and surveillance system 120.

The programmable content analysis agent 114 may also be adapted to receive control information from the system manager 108 via the network 112. Moreover, the programmable content analysis agent 114 may be adapted to be programmed or configured by the system manager 108. In this regard, the programming or configuration may be performed to add, remove, and/or upgrade features that correspond to the sensor analysis operations and/or security analysis operations performed by the programmable content analysis agent 114. The programming or configuration may be performed dynamically, that is, while the configurable security and surveillance system 120 is in operation. In other instances, the programming or configuration may be performed during installation or during maintenance periods when at least a portion of the configurable security and surveillance system 120 is not in operation.

The access controller 116 may comprise suitable logic, circuitry, and/or code that may be adapted to provide access to specified locations based on a verified security clearance. For example, upon keycard and/or biometric information verification, a user may enter a specified location or site in a building or campus covered by the configurable security and surveillance system 120. Access to that area by the user may be further detected by, for example, video surveillance functions provided by at least one programmable sensor agent located in the specified location or site. The programmable sensor agents may transfer information regarding the user to the programmable content analysis agent 114. The programmable content analysis agent 114 may process the user information and may add the results to other information that may have been generated on that user and that may be currently stored information in the programmable content analysis agent 114 and/or in the data storage device 110. A user may be represented by a label in the configurable security and surveillance system 120 and the user label may correspond to a data structure comprising information related to that user.

In another example, security and/or emergency personnel may be searching or attempting to locate a specified user. In this regard, the security and/or emergency personnel may query the configurable security and surveillance system 120 by label to locate the specified user. Data available on the data structure that corresponds to the user label may be utilized to accurately determine of the user's location. When additional data is required, the configurable security and surveillance system 120 may send control information to at least a portion of the programmable sensor agents and/or the access controller 116 to obtain additional data that may be utilized to locate the specified user.

The access controller 116 may provide an additional security function to the other security functions, for example, video surveillance, performed by the configurable security and surveillance systems 120. The system manager 108 may control this additional security function, at least in part. Moreover, the programmable content analysis agent 114 may be utilized to integrate at least a portion of the access control functions and other security functions.

Figure 2A:
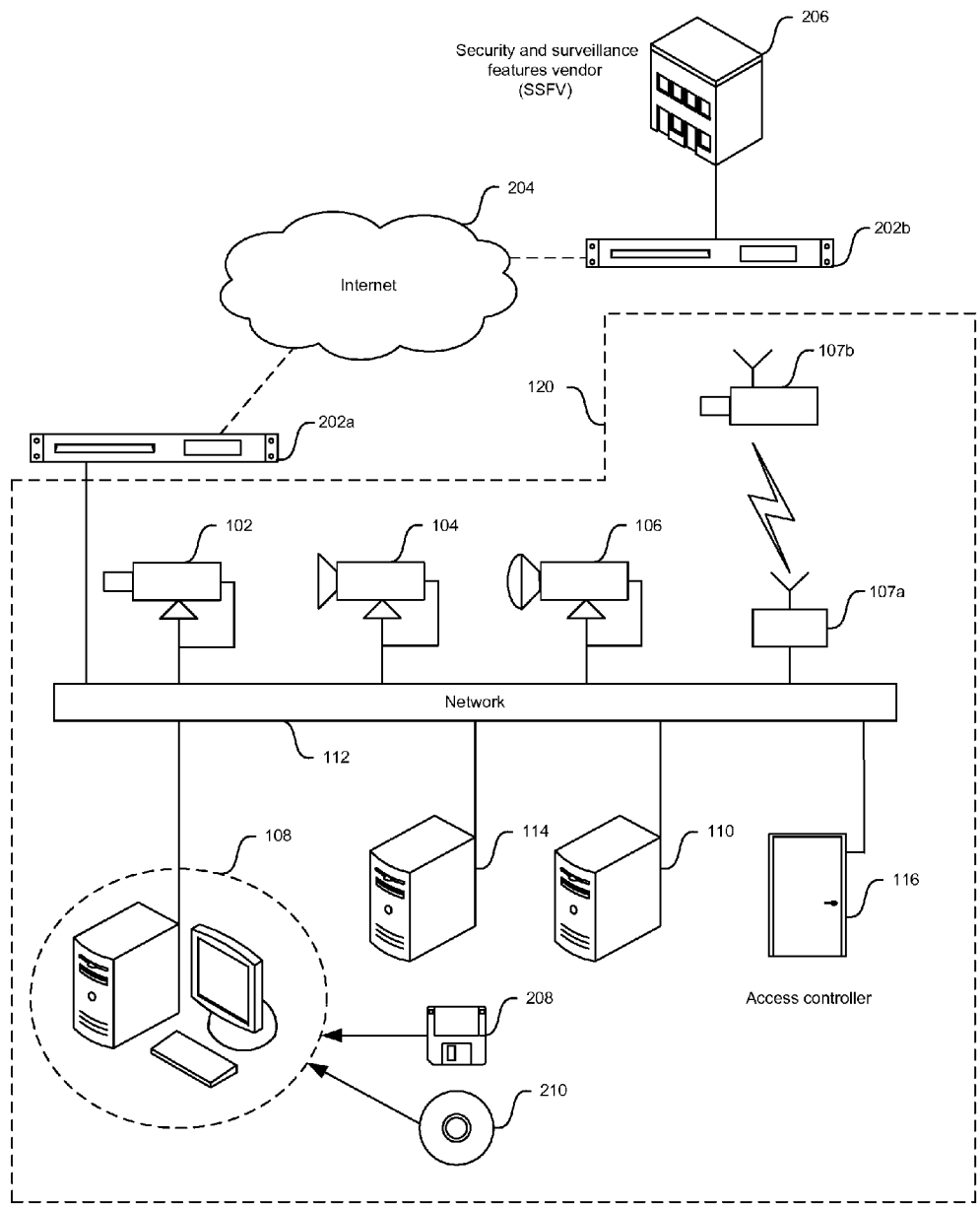
FIG. 2A illustrates an exemplary network comprising a configurable security and surveillance system and an e-commerce vendor, in accordance with an embodiment of the invention.

FIG. 2A illustrates an exemplary network comprising a configurable security and surveillance system and an e-commerce vendor, in accordance with an embodiment of the invention. Referring to FIG. 2A, there is shown the configurable security and surveillance system 120 as described in FIG. 1B, a security and surveillance features vendor (SSFV) 206, a first machine-readable media 208, a second machine-readable media 210, a first router 202a, a second router 202b, and the TCP/IP network 204.

The first router 202a may comprise suitable logic, circuitry, and/or code that may be adapted to communicatively couple the network 112 in the configurable security and surveillance system 120 to the TCP/IP network 204. The second router 202b may comprise suitable logic, circuitry, and/or code that may be adapted to communicatively couple the SSFV 206 to the TCP/IP network 204.

The first machine-readable media 208 and the second machine-readable media 210 are examples of media that may be utilized to provide the configurable security and surveillance system 120 with device programming files, decryption keys, and/or operating software or code that may be utilized by the system manager 108, the programmable content analysis agent 114, the data storage device 110, and/or the access controller 116. While the first machine-readable media 208 as shown corresponds to at least one diskette and the second machine-readable media 210 as shown corresponds to at least one optical disk, other machine-readable media may also be utilized in this regard.

The SSFV 206 may be an e-commerce vendor that provides a plurality of features that may be programmed into a programmable agent in the configurable security and surveillance system 120. A programmable agent may refer to a programmable sensor agent such as those represented by the programmable sensor agents 102, 104, 106, 107b and/or a programmable content analysis agent 114. The SSFV 206 may be adapted to receive requests for device programming files and/or decryption keys that may be utilized to configure or program at least one of the programmable agents. Decryption keys may be requested from the SSFV 206 when at least a portion of the device programming files is encrypted. The SSFV 206 may transfer any requested device programming files and/or decryption keys to the system manager 108 via the TCP/IP network 204 and the network 112. In some instances, the SSFV 206 may transfer any requested device programming files and/or decryption keys to the system manager 108 via at least one machine-readable media.

Figure 2B:
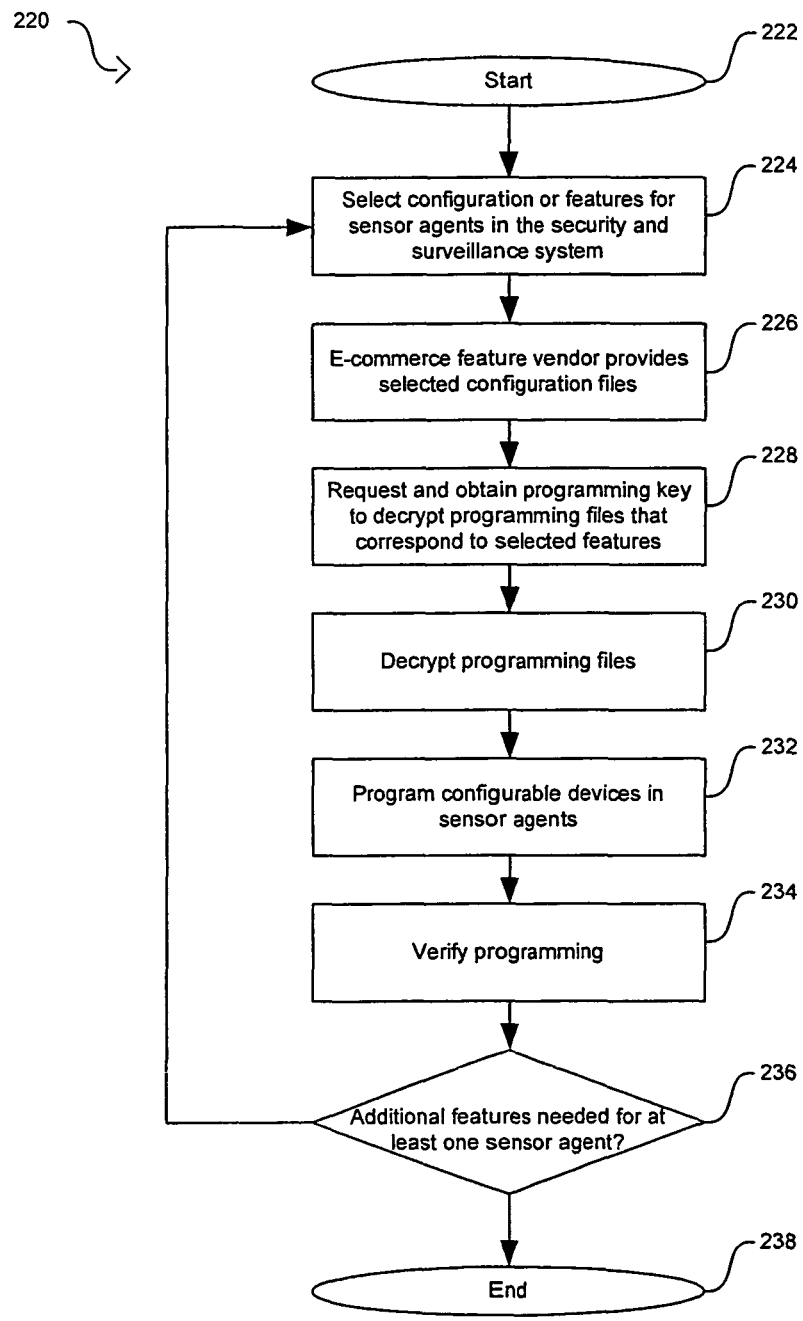
FIG. 2B is a flow diagram illustrating exemplary steps for configuring a programmable sensor agent, in accordance with an embodiment of the invention.

FIG. 2B is a flow diagram illustrating exemplary steps for configuring a programmable sensor agent, in accordance with an embodiment of the invention. Referring to FIG. 2B, after start step 222, in step 224, features may be selected that may be programmed into at least one configurable device in at least one programmable sensor agent in a configurable security and surveillance system. In step 226, an e-commerce feature vendor may provide device programming files for the selected features. The device programming files may be transfer to the configurable security and surveillance system via a network connection and/or via machine-readable media. In step 228, decryption or programming keys may be requested and obtained from the e-commerce feature vendor for device programming files that are encrypted. The decryption keys may be provided to the configurable security and surveillance system via a network connection and/or via machine-readable media.

In step 230, the encrypted device programming files may be decrypted by utilizing the decryption keys received in step 228. In step 232, the device programming files may be transferred to the programmable sensor agents to program the configurable devices. In step 234, the programming of the configurable devices in the programmable sensor agents may be verified. In step 236, a user and/or installer of the configurable security and surveillance system may determine whether new, additional, and/or upgraded features may be necessary in at least one programmable sensor agent. When a user may find new, additional, and/or upgraded features necessary, the flow chart 220 may proceed to step 224 where new, additional, and/or upgraded features may be selected. When a user may not require new, additional, and/or upgraded features, the flow chart 220 may proceed to end step 238.

Figure 3A:
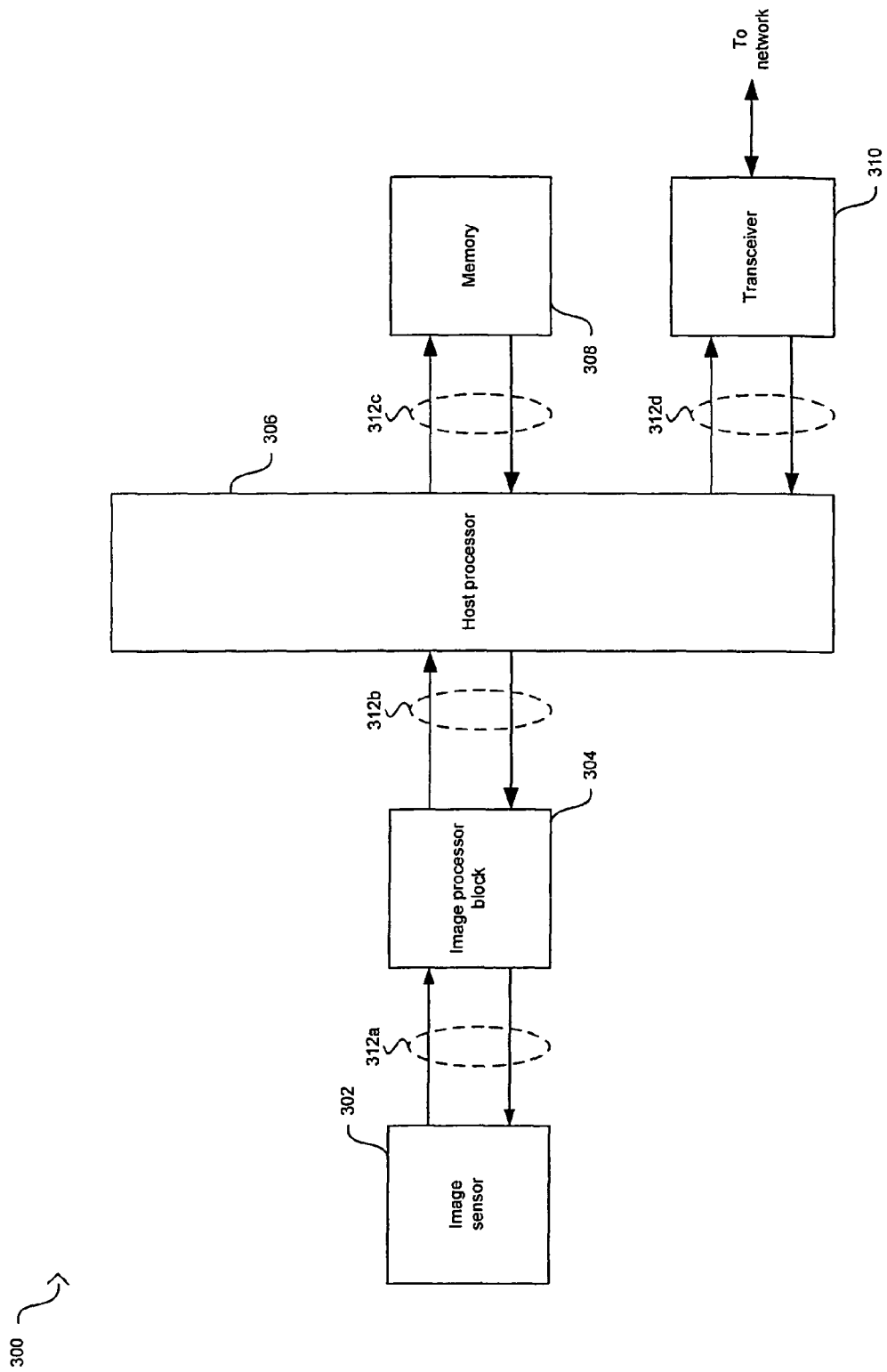
FIG. 3A is a block diagram illustrating an exemplary programmable camera for a configurable security and surveillance system, in accordance with an embodiment of the invention.

FIG. 3A is a block diagram illustrating an exemplary programmable camera for a configurable security and surveillance system, in accordance with an embodiment of the invention. Referring to FIG. 3A, there is shown a programmable sensor agent 300 that may comprise an image sensor 302, an image processor block 304, a host processor 306, a memory 308, and a transceiver 310. Communication of control and/or data information between components in the programmable sensor agent 300 may be performed via signals 312*a*, . . . , 312*d*. For example, signals 312*a* may be utilized to transfer control and/or data information between the image sensor 302 and the image processor block 304, signals 312*b* between the image processor block 304 and the host processor 306, signals 312*c* between the host processor 306 and the memory 308, and signals 312*d* between the host processor 306 and the transceiver 310.

The image sensor 302 may comprise suitable logic, circuitry, and/or code that may be adapted to perform image capture operations. The image sensor 302 may also be adapted to perform processing on the captured image information. For example, the image sensor 302 may be adapted to perform analog and/or digital processing on a captured image. Moreover, the image sensor 302 may be adapted to modify its analog and/or digital processing in accordance with control signals received from the image processor block 304. The image sensor 302 may be a CCD imager, a CMOS imager, or another type of solid-state imager, such as, for example, a gallium arsenide (GaAs) image sensor. The image sensor 302 may be adapted to provide monochrome, color, infrared (IR), and/or terahertz (THz) information of the captured image. For example, an IR-based imager may be utilized for gathering thermal information of the captured image.

The image processor block 304 may comprise suitable logic, circuitry, and/or code that may be adapted to process image information captured by the image sensor 302. The image processor block 304 may be adapted to provide image processing and/or image compression operations, for example. At least some of the features and/or operations provided by the image processor block 304 may be configured or programmed via the host processor 306. In this regard, the operations performed by the image processor block 304 may be upgraded and/or modified as described in FIGS. 2A-2B. The image processor block 304 may be adapted to, for example, convert the video to a lower bit rate, to a lower or higher spatial resolution, and/or to a different video format such as PAL or NTSC format.

The host processor 306 may comprise suitable logic, circuitry, and/or code that may be adapted to manage and/or control the operations of the programmable sensor agent 300. In this regard, the host processor 306 may receive processed information from the image processor block 304 and may transfer the processed information to the memory 308 for storage and/or the transceiver 310 for transmission to the network 112, for example. The host processor 306 may also be adapted to receive information from the transceiver 310 and transfer the received information to the memory 308 for storage and/or to the image processor block 304. For example, the host processor 306 may receive configuration files and may utilize the configuration files to configure or program at least a portion of the image processor block 304. The host processor 306 may receive startup information from the memory 308, where the startup information may comprise device programming files that may be utilized to configure or program at least a portion of the image processor block 304 during a startup mode of the programmable sensor agent 300.

The memory 308 may comprise suitable logic, circuitry, and/or code that may be adapted to store information. The memory 308 may comprise at least one memory device or chip, where a memory device may be a random access memory (RAM), a read only memory (ROM), a flash memory, and/or other types of non-volatile memory. The memory 308 may be utilized to store, for example, temporary information needed by the host processor 306 for control and/or management operations, to store device programming files, and/or to store startup information needed for a startup mode of operation of the programmable sensor agent 300. In instances where a failure in the operation of the programmable sensor agent 300 is detected, a status of at least some of the conditions that lead to the failure may be stored in the memory 308 for servicing or repair operations.

The transceiver 310 may comprise suitable logic, circuitry, and/or code that may be adapted to modify and/or adapt information received from the network 112 to be transferred to the host processor 306. The transceiver 310 may also be adapted to modify and/or adapt information received from the host processor 306 to be transferred to the network 112. The transceiver 310 may be adapted to communicate with the network 112 via a wireless or a wireline connection. The transceiver 310 may be, for example, an Ethernet transceiver.

During video or image capture operations, for example, the image processor block 304 may generate signals that control the operation of the image sensor 302. The image sensor 302 may capture image information based on received control signals and may transfer the captured image information to the image processor block 304. The image processor block 304 may process and/or compress the image information. The image processor block 304 may transfer the processed and/or compressed image information to the host processor 306. The host processor 306 may transfer the processed and/or compressed image information to the memory 306 and/or to the transceiver 310.

During startup operations, for example, the host processor 306 may receive a startup device programming file from the memory 308. The host processor 306 may program the image processor block 304 based on the startup device programming file. The host processor 306 may verify that the programming or configuration of the image processor block 304 has been completed successfully. When the programming or configuration has been completed successfully, the host processor 306 may generate a signal to indicate that the programming or configuration has been verified. The verification signal may be transferred to the system manager 108, for example, via the network 112. The system manager 108 may, for example, update its database to indicate that a specified programmable sensor agent has been successfully configured during startup operations.

During upgrade and/or maintenance operations, for example, the host processor 306 may receive a device programming file from the transceiver 310. The host processor 306 may program the image processor block 304 based on the device programming file. The host processor 306 may verify that the programming or configuration of the image processor block 304 has been completed successfully. When the programming or configuration has been completed successfully, the host processor 306 may generate a signal to indicate that the programming or configuration has been verified. The verification signal may be transferred to the system manager 108, for example, via the network 112. The system manager 108 may, for example, update its database to indicate that a specified programmable sensor agent has been successfully configured during upgrade and/or maintenance operations.

Figure 3B:
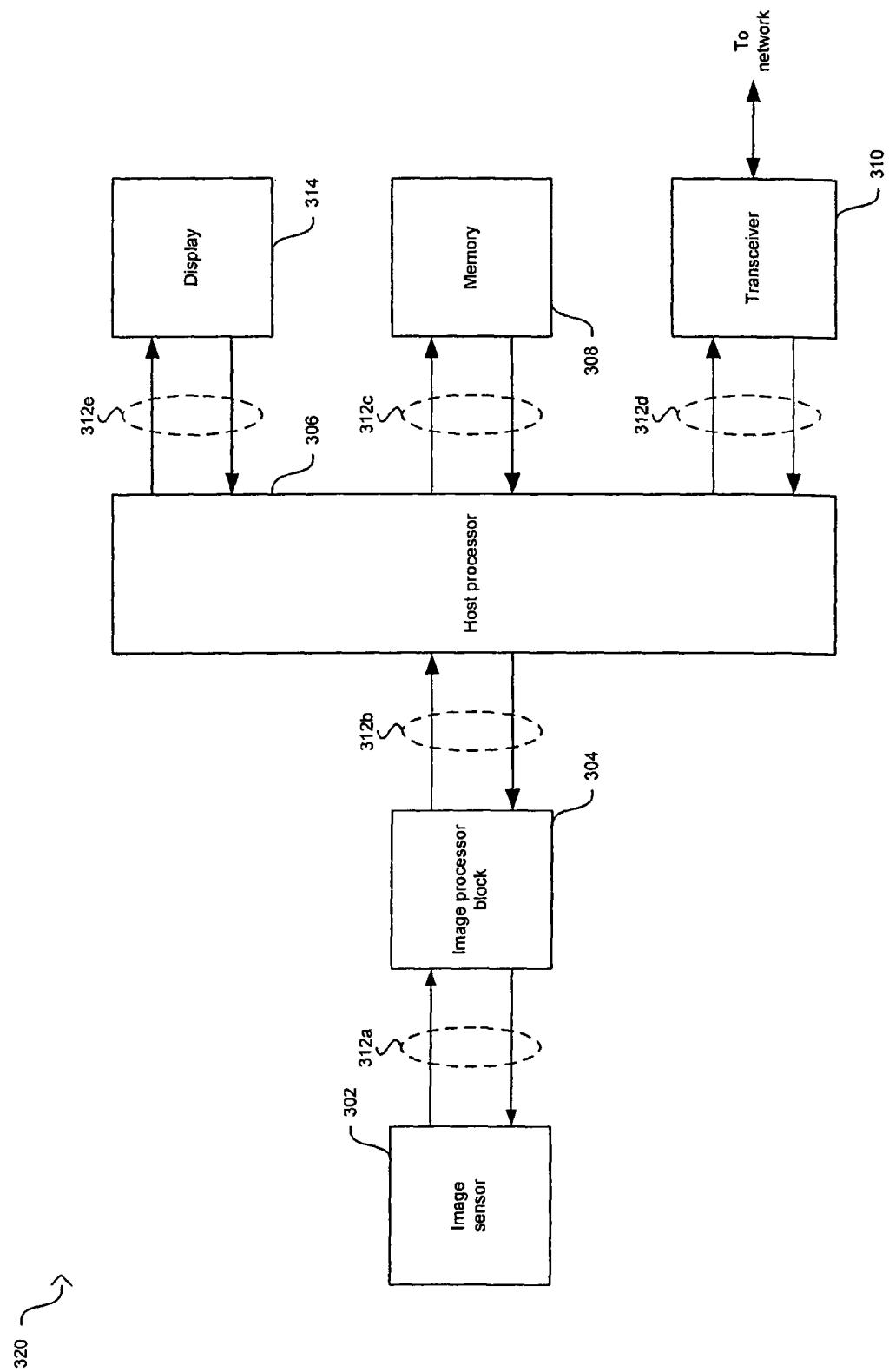
FIG. 3B is a block diagram illustrating an exemplary programmable camera with a display, in accordance with an embodiment of the invention.

FIG. 3B is a block diagram illustrating an exemplary programmable camera with a display, in accordance with an embodiment of the invention. Referring to FIG. 3B, a programmable sensor agent 320 is shown that comprises a display 314. The programmable sensor agent 320 may also comprise the image sensor 302, the image processor block 304, the host processor 306, the memory 308, and the transceiver 310 substantially as described in FIG. 3A. Signals 312e may be utilized to transfer control and/or data information between host processor 306 and the display 314, for example. The display 314 may also be referred to as a display interface. The display 314 may comprise suitable logic, circuitry, and/or code that may be adapted to display information associated with the operation of the programmable sensor agent 320. For example, the display 314 may be utilized to display the version or date of the device programming files utilized for configuring portions of the programmable sensor agent 320, to display networking information, and/or to display features supported by the programmable sensor agent 320, for example.

The display 314 may also be adapted to be an interactive display. In this regard, a user, an camera installer, for example, may utilize the display 314 to update device programming files, to modify, add, and/or remove features from the programmable sensor agent 320, and/or to verify and/or modify networking information associated with the programmable sensor agent 320. The display 314 may also be utilized as an interface to the system manager 108. In this regard, device programming files in the system manager 108 may be requested by a user via the display 314 and may be transferred to the programmable sensor agent 320 via the network 112 and the transceiver 310.

Figure 3C:
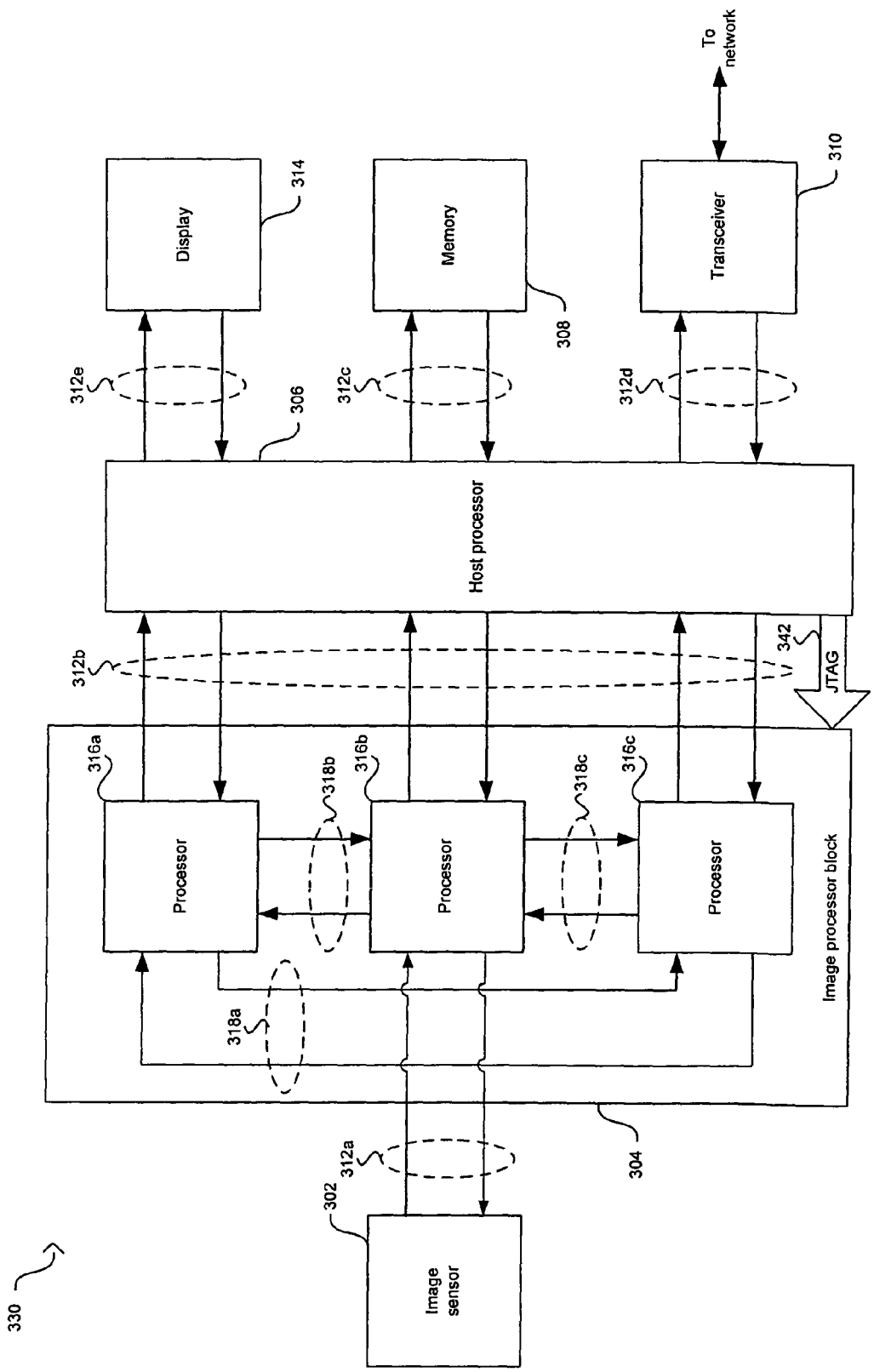
FIG. 3C is a block diagram illustrating an exemplary image processor in a programmable camera, in accordance with an embodiment of the invention.

FIG. 3C is a block diagram illustrating an exemplary image processor in a programmable camera, in accordance with an embodiment of the invention. Referring to FIG. 3C, there is shown a programmable sensor agent 330 with the image processor block 304 comprising a first processor 316a, a second processor 316b, and a third processor 316c. The programmable sensor agent 330 may also comprise the image sensor 302, the host processor 306, the memory 308, the transceiver 310, and the display 314 substantially as described in FIGS. 3A-3B. The first processor 316a, the second processor 316b, and the third processor 316c may comprise suitable logic, circuitry, and/or code that may be adapted to be configured or programmed to process based on device programming files. The first processor 316a, the second processor 316b, and the third processor 316c may also be referred to as configurable devices. The image processor block 304 need not be limited to an implementation that utilizes three configurable devices as shown in this illustrative example. Accordingly, the image processor block 304 may be implemented with at least one configurable device.

Signals 312b may be utilized to transfer control and/or data information between the host processor 306 and the first processor 316a, the second processor 316b, and the third processor 316c. In this regard, the host processor 306 may be utilized to configure or program device programming files into at least a portion of each of the first processor 316a, the second processor 316b, and the third processor 316c. The host processor 306 may be utilized to verify that the configuration or programming has been completed successfully.

The host processor 306 may configure or program at least a portion of the first processor 316a, the second processor 316b, and/or the third processor 316c based on a boundary-scan in-system programming joint test action group (JTAG) signal 342, for example. The JTAG signal may be utilized to program or configure the configurable devices in the image processor block 304 and to verify that the programming or configuration has been completed successfully.

The processing operations performed by the image processor block 304 may be partitioned or separated among its configurable devices, that is, the first processor 316a, the second processor 316b, and the third processor 316. For example, image capture processing chain operations may be performed by the second processor 316b after receiving image data from the image sensor 302 via the signals 312a. The signals 312a may be implemented utilizing an I2C or a serial bus, for example. In this regard, a device programming file that comprises an intellectual property (IP) core for image capture processing chain operations may be transferred to the second processor 316b from the host processor 306. The image capture processing chain may comprise a color correction operation, an image interpolation operation, and/or an image enhancement operation. Each of the operations in the image capture processing chain may be implemented in a separate IP core, for example.

The second processor 316b may be, for example, an FPGA, a CPLD, or a custom-made reconfigurable chip with embedded SRAM and/or FLASH memory that enables, for example, JTAG programming via the host processor 306. In this regard, a device programming file utilized to configure the second processor 316b may comprise VHDL or RTL information, for example. The IP core comprising the image capture processing chain may be compiled onto the second processor 316b and the host processor 306 may verify that the programming operation was completed successfully.

The first processor 316a may be utilized, for example, for image analysis, system failure management, and/or maintenance operations. Image analysis features may be upgraded in accordance with the security measures supported by the programmable sensor agent 330. An example of an image analysis feature is detection of dirt on the lens of the camera. When dirt is detected, the first processor 316a may generate a signal that may be transferred to the system manager 108 to indicate that the lens needs to be cleaned. The first processor 316a may receive a device programming file that comprises an IP core for image analysis, system failure management, and/or maintenance operations. In some instances, multiple IP cores may be programmed into the first processor 316a. The first processor 316a may also be adapted to determine, based on image analysis, when a dangerous situation may be occurring. In this regard, the first processor 316a may be adapted to generate a signal that may be utilized to enable or activate a mechanism, such as an electromagnetic shock, for example, that may be utilized to neutralize the dangerous situation. In this regard, the programmable sensor agent 330 may comprise a built-in device that supports the application of the electromagnetic shock.

The first processor 316a may be, for example, an FPGA, a CPLD, or a custom-made reconfigurable chip with embedded SRAM and/or FLASH memory that enables JTAG programming via the host processor 306. In this regard, a device programming file utilized to configure the first processor 316a may comprise VHDL or RTL information, for example. The IP core comprising the image analysis, system failure management, and/or maintenance operations may be compiled onto the first processor 316a and the host processor 306 may verify that the programming operation was completed successfully. The first processor 316a may be adapted to receive data and/or control information from the second processor 316b and the third processor 316c via signals 318b and 318a respectively.

The third processor 316c may be utilized, for example, to receive processed captured image data and generate data content descriptors. In this regard, the third processor 316c may implement a compression operation, such as the motion pictures expert group 7 (MPEG-7) standard, for example, to generate at least a portion of the content descriptors. The data content descriptors may comprise motion, color, and/or shape descriptors, for example. A compression operation may be utilized to generate the motion descriptors. The generation and type of data content descriptors may vary in accordance with a particular security feature or security operation. The third processor 316b may receive a device programming file that comprises an IP core for generating data content descriptors.

The third processor 316c may be, for example, an FPGA, a CPLD, or a custom-made reconfigurable chip with embedded SRAM and/or FLASH memory that enables JTAG programming via the host processor 306. In this regard, a device programming file utilized to configure the third processor 316c may comprise VHDL or RTL information, for example. The IP core comprising operations for generating data content descriptors via the MPEG-7 standard may be compiled onto the third processor 316c and the host processor 306 may verify that the programming operation was completed successfully. The third processor 316c may be adapted to receive data and/or control information from the second processor 316b and the first processor 316a via signals 318c and 318a respectively.

Figure 3D:
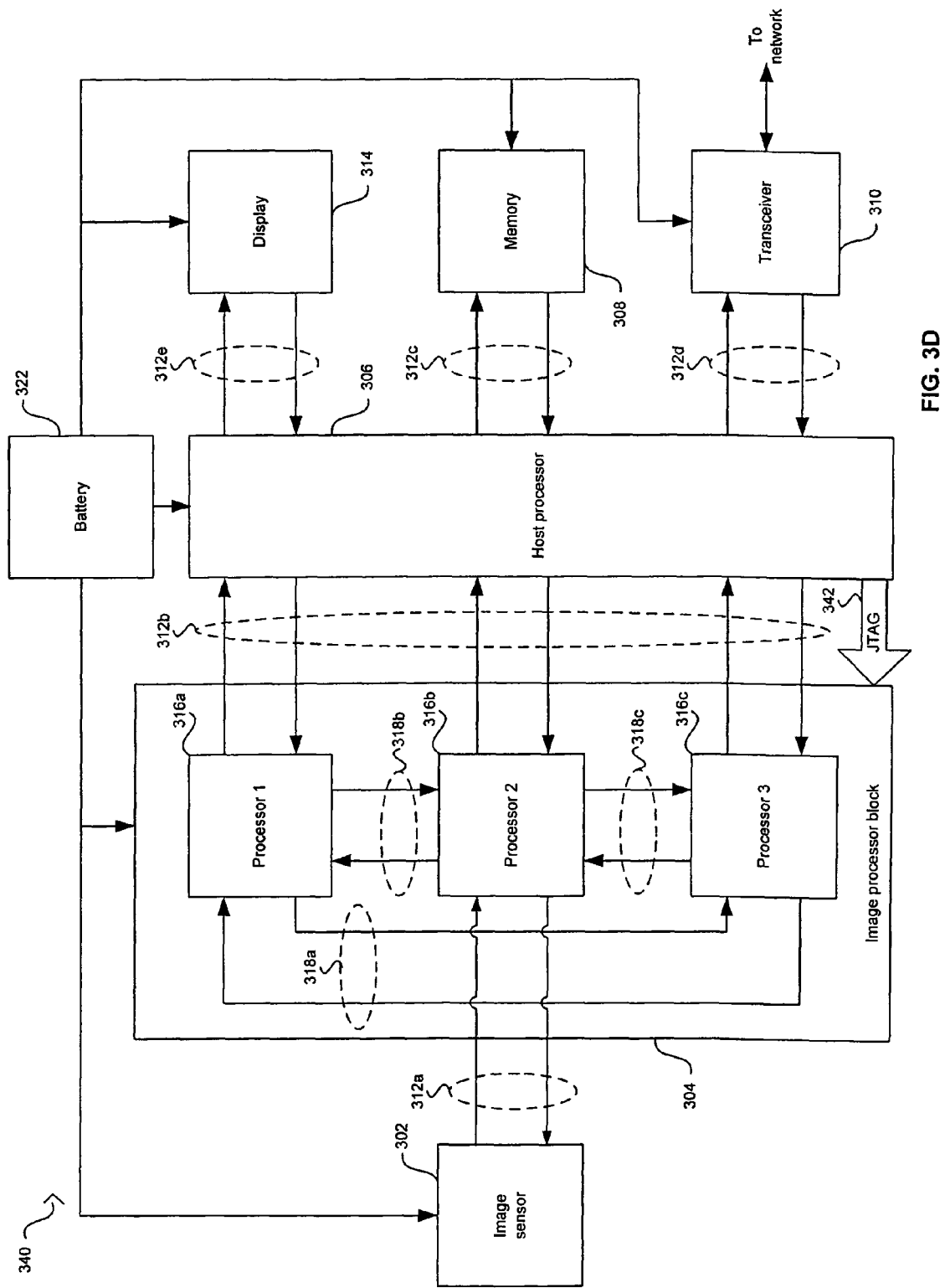
FIG. 3D is a block diagram illustrating an exemplary battery backup system for a programmable camera, in accordance with an embodiment of the invention.

FIG. 3D is a block diagram illustrating an exemplary battery backup system for a programmable camera, in accordance with an embodiment of the invention. Referring to FIG. 3D, there is shown a programmable sensor agent 340 with a battery 322. The programmable sensor agent 340 may also comprise the image sensor 302, the image processor block 304, the host processor 306, the memory 308, the transceiver 310, and the display 314 substantially as described in FIGS. 3A-3C. The battery 322 may comprise suitable logic and/or circuitry that may be adapted to provide backup power to the programmable sensor agent 340 in instances when the source of power is disrupted. In this regard, the battery 322 may be selected to provide sufficient power to operate the programmable sensor agent 340 for a specified duration of time. The first processor 316a, when adapted to perform system failure management, may comprise a feature that generates a signal that enables the battery 322 to be activated as a backup power supply during power supply failure, for example.

Figure 3E:
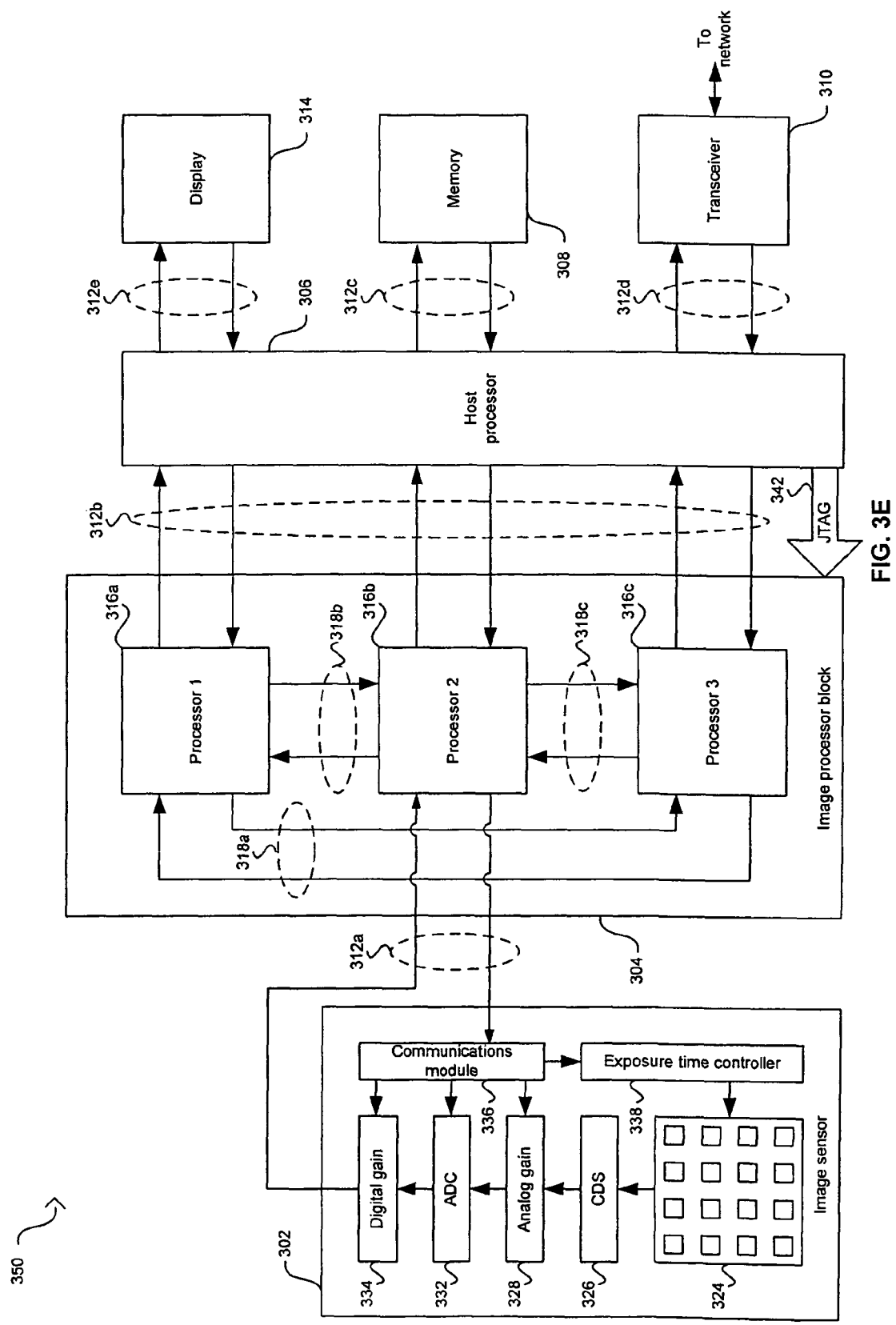
FIG. 3E is a block diagram illustrating an exemplary image sensor in a programmable camera, in accordance with an embodiment of the invention.

FIG. 3E is a block diagram illustrating an exemplary image sensor in a programmable camera, in accordance with an embodiment of the invention. Referring to FIG. 3E, there is shown a programmable sensor agent 350 with the image sensor 302 comprising a pixel array 324, a correlated double sampler (CDS) 326, an analog gain 328, an analog-to-digital converter (ADC) 332, a digital gain 334, a communications module 336, and an exposure time controller 338. The programmable sensor agent 350 may also comprise the image processor block 304, the host processor 306, the memory 308, the transceiver 310, and the display 314 substantially as described in FIGS. 3A-3C.

The pixel array 324 may comprise suitable logic and/or circuitry that may be adapted to convert electromagnetic energy into an analog signal. In this regard, the pixel array 324 may comprise a plurality of pixel elements. In some instances, the pixel array 324 may be adapted to perform analog-to-digital conversion at each pixel element. The exposure time controller 338 may comprise suitable logic, circuitry, and/or code that may be adapted to generate exposure and control signals that may be transferred to the pixel array 324. The exposure and control signals may be utilized to control the time and rate of exposure of the pixel element, image windowing, and/or night mode operations, for example. The CDS 326 may comprise suitable logic and/or circuitry that may be adapted to perform correlated double sampling on the analog signals generated by the pixel array 324.

The analog gain 328 may comprise suitable logic and/or circuitry that may be adapted to amplify the analog signals generated by the CDS 328. The gain in the analog gain 328 may be set based on register settings in the communications module 336. The ADC 332 may comprise suitable logic and/or circuitry that may be adapted to convert analog signals to digital signals. Some control and/or reference signals in the ADC 332 may be set based on register settings in the communications module 336. The digital gain 334 may comprise suitable logic and/or circuitry that may be adapted to amplify a digital signal. The gain in the digital gain 334 may be set based on register settings in the communications module 336. Digital information from the digital gain 334 may be transferred to the second processor 316b from the image sensor 302 via the signals 312a for processing.

The communications module 336 may comprise suitable logic, circuitry, and/or code that may be adapted to receive information from the second processor 316b when the second processor 316b is adapted to perform an image capture processing chain. The communications module 336 may comprise at least one register that may be utilized to control the operation of the CDS 326, the analog gain 328, the ADC 332, the digital gain 334, and/or the exposure time controller 338. In this regard, information received from the second processor 316b may be stored in the registers in the communications module 336. The communications module 336 may communicate with the second processor 316 via an I2C or serial bus, for example. In some instances, the information received by the communications module 336 may have been sent from the display 314 and/or from the system manager 108 via the network 112.

Figure 4A:
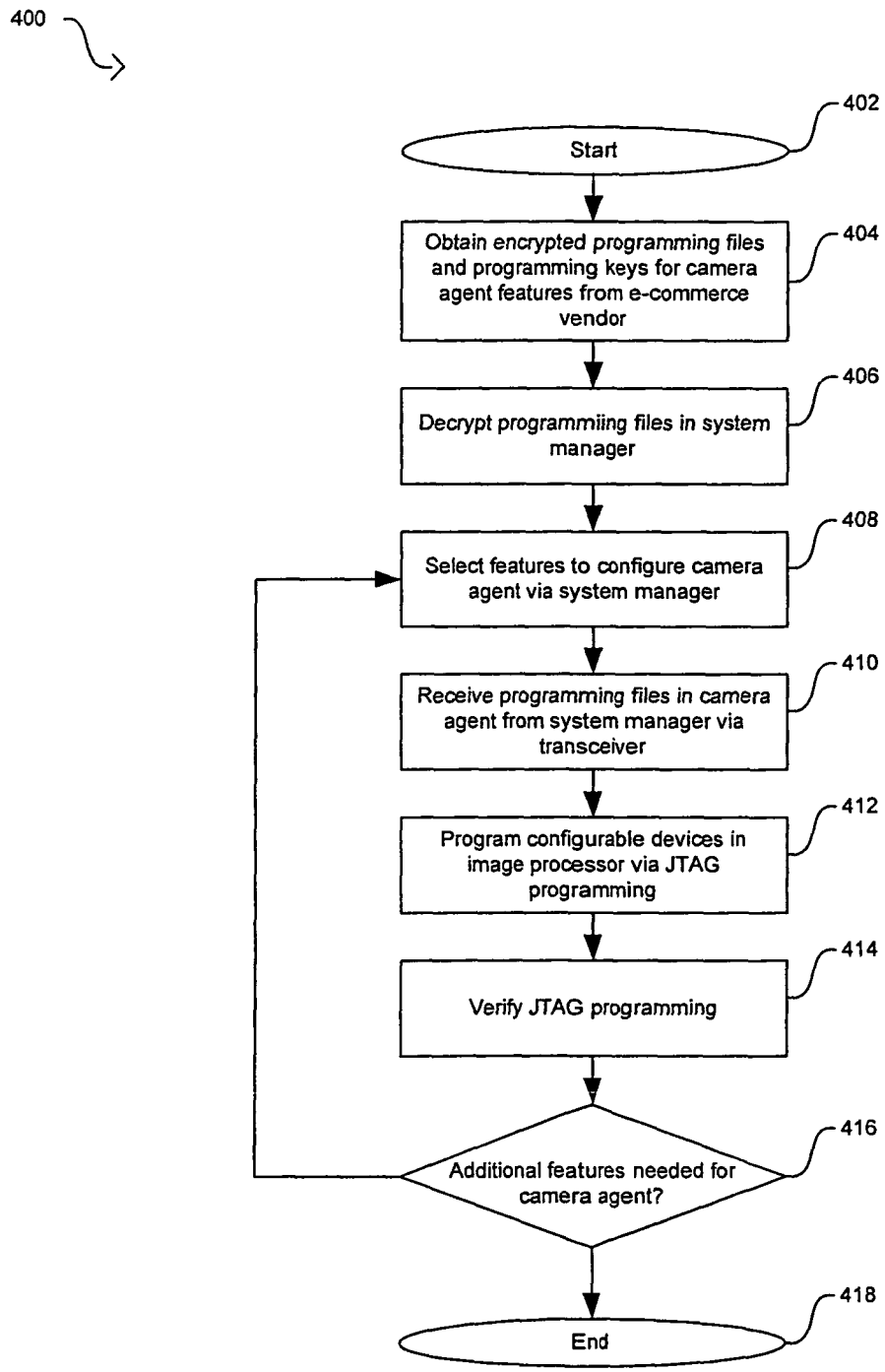
FIG. 4A is a flow diagram illustrating exemplary steps for configuring a programmable camera via a system manager, in accordance with an embodiment of the invention.

FIG. 4A is a flow diagram illustrating exemplary steps for configuring a programmable camera via a system manager, in accordance with an embodiment of the invention. Referring to FIG. 4A, after start step 402, in step 404, features that may be programmed into at least one configurable device in at least one programmable sensor agent in a configurable security and surveillance system may be provided by an e-commerce feature vendor. Decryption keys may be requested and obtained from the e-commerce feature vendor for device programming files that are encrypted. The device programming files and/or decryption keys may be provided to the configurable security and surveillance system via a network connection and/or via machine-readable media.

In step 406, the encrypted device programming files may be decrypted by utilizing the decryption keys received in step 404. In step 408, security features may be selected for configuration into specified programmable sensor agents via the system manager 108 by selecting the corresponding device programming files for transfer to the specified programmable sensor agents. In step 410, the specified programmable sensor agents receive the selected device programming files from the system manager 108. In this regard, each of the specified programmable sensor agents receives the device programming files via the transceiver 310. In step 412, the configurable devices in the image processor block 304 may be programmed by utilizing the device programming files received in step 410. The configurable devices may be programmed via the JTAG port in the host processor 306. In step 414, the host processor 306 may verify the programming of the configurable devices in the programmable sensor agents.

In step 416, a user, installer, and/or system manager may determine whether new, additional, and/or upgraded features may be necessary in at least one programmable sensor agent. When a user may find new, additional, and/or upgraded features necessary, the process may proceed to step 408 where a selection may be made via the system manager 108. When a user may not require new, additional, and/or upgraded features in at least one programmable sensor agent, the process may proceed to end step 418.

Figure 4B:
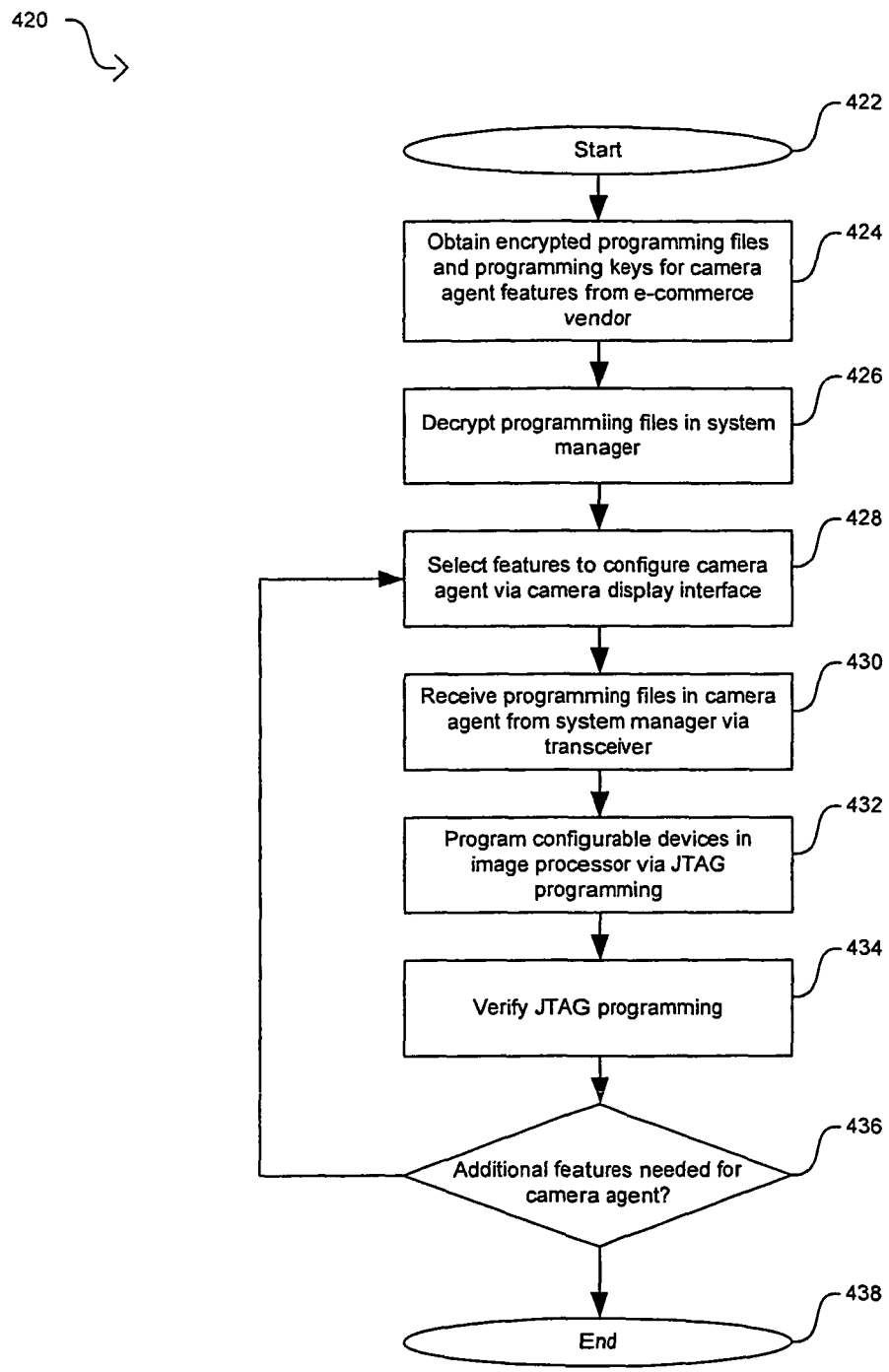
FIG. 4B is a flow diagram illustrating exemplary steps for configuring a programmable camera via a display interface, in accordance with an embodiment of the invention.

FIG. 4B is a flow diagram illustrating exemplary steps for configuring a programmable camera via a display interface, in accordance with an embodiment of the invention. Referring to FIG. 4B, after start step 422, in step 424, features that may be programmed into at least one configurable device in at least one programmable sensor agent in a configurable security and surveillance system may be provided by an e-commerce feature vendor. Decryption keys may be requested and obtained from the e-commerce feature vendor for device programming files that are encrypted. The device programming files and/or decryption keys may be provided to the configurable security and surveillance system via a network connection and/or via machine-readable media.

In step 426, the encrypted device programming files may be decrypted by utilizing the decryption keys received in step 404. In step 428, a user, an installer, for example, may select security features via the display 314 for configuration into the programmable sensor agent currently being attended. The selection generates a signal to the system manager 108 to transfer the corresponding device programming files to the programmable sensor agent being attended. In step 430, the programmable sensor agent being attended receives the corresponding device programming files from the system manager 108 via the transceiver 310. In step 432, the configurable devices in the image processor block 304 may be programmed by utilizing the device programming files received in step 430. The configurable devices may be programmed via the JTAG port in the host processor 306. In step 434, the host processor 306 may verify that the programming of the configurable devices in the programmable sensor agent being attended is successful. In this regard, an indication may be provided to the installer via the display 314.

In step 436, the installer may determine whether new, additional, and/or upgraded features may be necessary in the programmable sensor agent being attended. When the user finds that new, additional, and/or upgraded features are necessary, the process may proceed to step 428 where a selection may be made via the display 314. When the user may not require new, additional, and/or upgraded features in the programmable sensor agent being attended, the process may proceed to end step 438.

Figure 5:
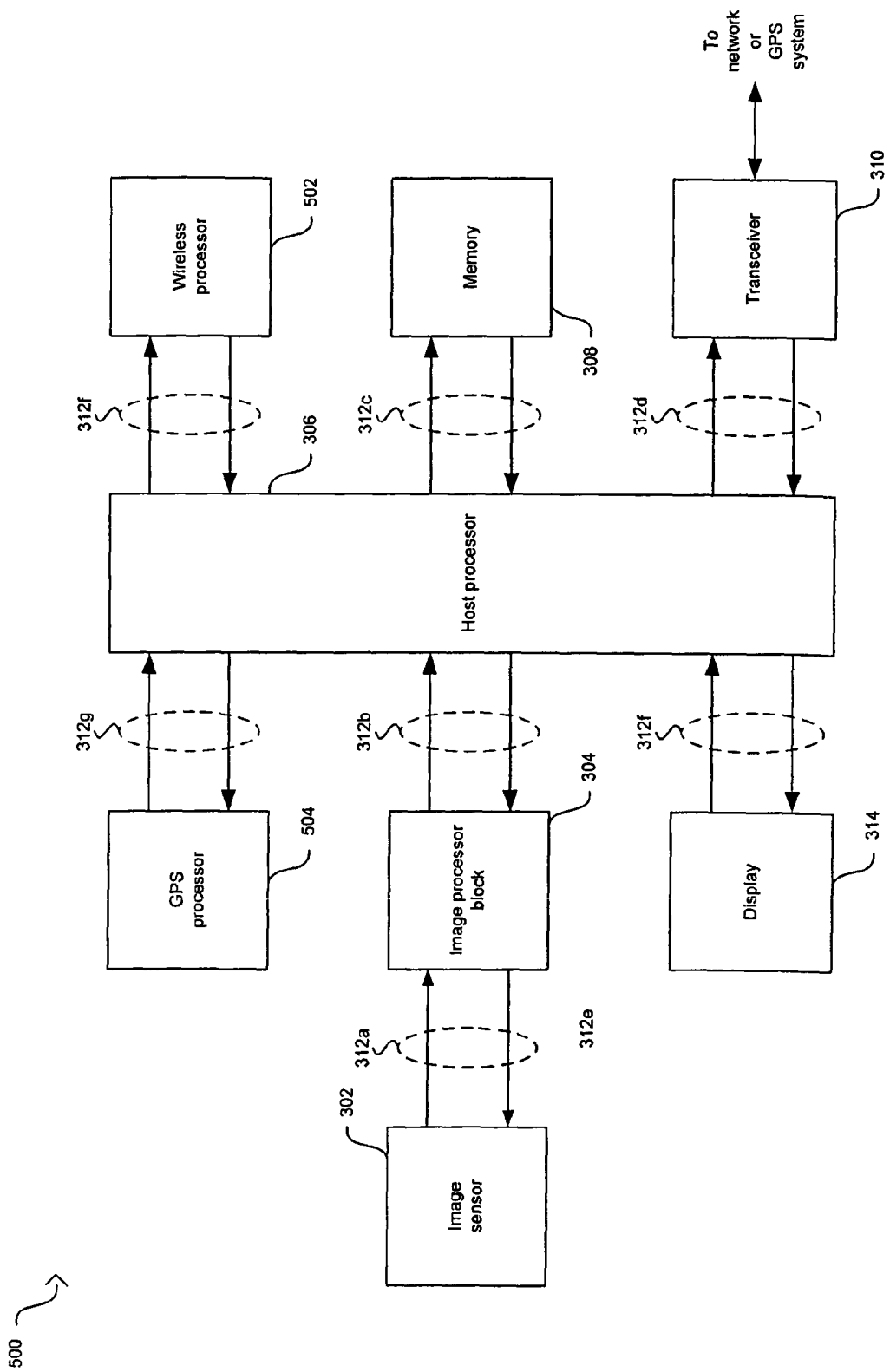
FIG. 5 is a block diagram illustrating an exemplary programmable camera with a wireless processor and a GPS processor, in accordance with an embodiment of the invention.

FIG. 5 is a block diagram illustrating an exemplary programmable camera with a wireless processor and a GPS processor, in accordance with an embodiment of the invention. Referring to FIG. 5, there is shown a programmable sensor agent 500 that comprises the image sensor 302, the image processor block 304, the host processor 306, the memory 308, the transceiver 310, the display 314, a wireless processor 502, and a global positioning system (GPS) processor 504.

The wireless processor 502 may comprise suitable logic, circuitry, and/or code that may be adapted to process data for wireless communication. In this regard, the wireless processor 502 may be utilized in programmable sensor agents adapted for wireless communication such as the wireless programmable sensor agent 107b described in FIG. 1A. The wireless processor 502 may be implemented as a configurable device and may be programmed or configured via the JTAG port of the host processor 206. The wireless processor 502 may be adapted to support at least one wireless communication protocol such as GSM, WLAN, and/or Bluetooth, for example. The wireless processor 502 may communicate data formatted for wireless communication to the network 112 via the transceiver 310. Signals 312f may be utilized to transfer control and/or data information between the wireless processor 502 and the host processor 306.

The GPS processor 504 may comprise suitable logic, circuitry, and/or code that may be adapted to process position data provided by a GPS system. In this regard, the position data may be utilized to locate mobile programmable sensor agents, for example. In other instances, the positioning data may be utilized by the image processor block 304 to generate, for example, three-dimensional information of captured images. The GPS processor 504 may be implemented as a configurable device and may be programmed or configured via the JTAG port of the host processor 206. The GPS processor 504 may position information via the transceiver 310. Signals 312g may be utilized to transfer control and/or data information between the GPS processor 504 and the host processor 306.

Figure 6A:
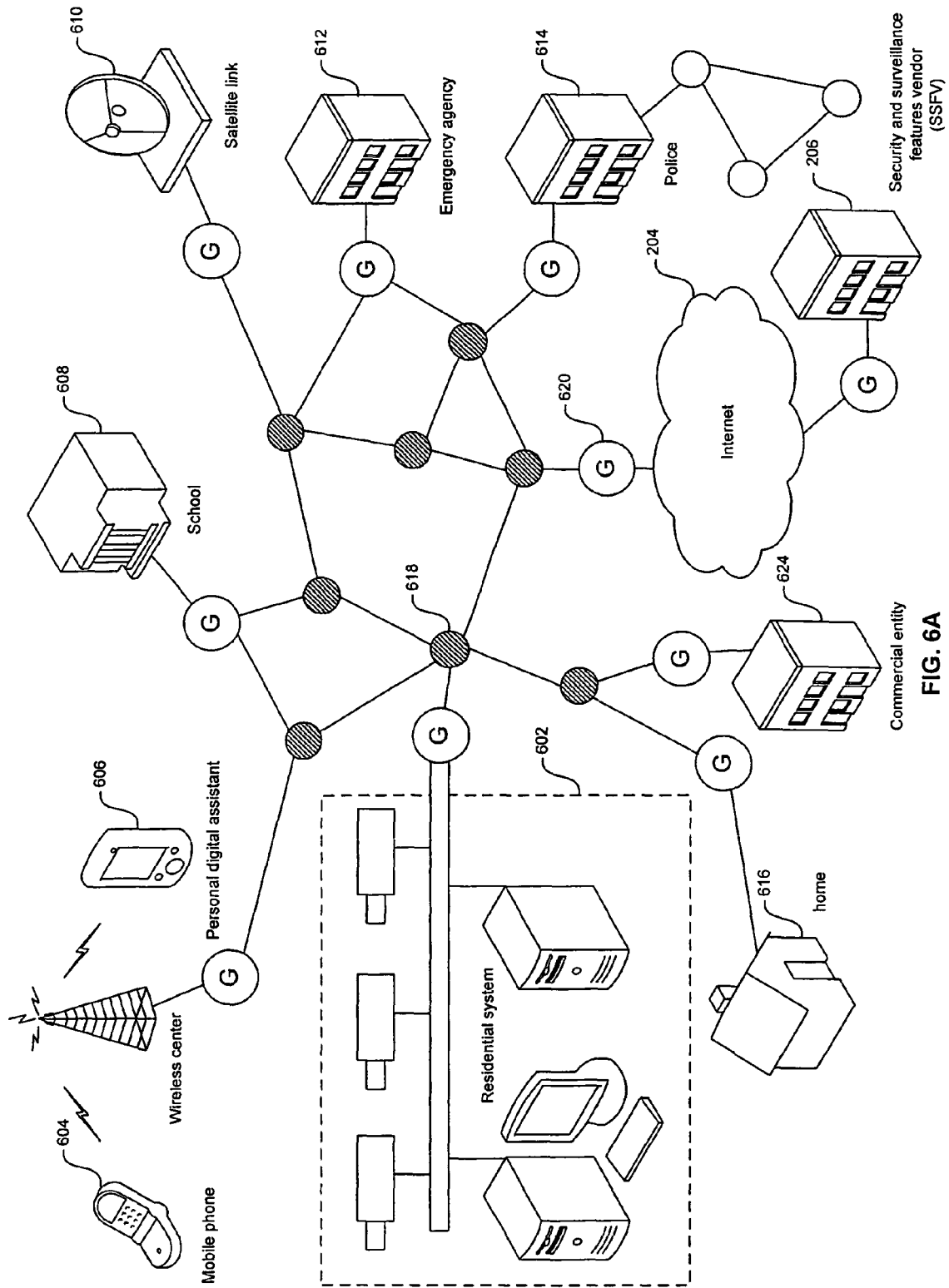
FIG. 6A illustrates an exemplary network comprising a residential configurable security and surveillance system, in accordance with an embodiment of the invention.

FIG. 6A illustrates an exemplary network comprising a residential configurable security and surveillance system, in accordance with an embodiment of the invention. Referring to FIG. 6A, there is shown a network 600 that comprises a residential configurable security and surveillance system 602 substantially as described in FIGS. 1A-1B, a mobile phone 604, a wireless center 626, a personal digital assistant (PDA) 606, a school 608, a satellite link 610, an emergency agency 612, a police center 614, a home 616, at least one core router 618, at least one gate router 620, a commercial entity 624, a security and surveillance features vendor (SSFV) 206 as described in FIG. 2A, and a TCP/IP network 204 also as described in FIG. 2A. The core router 618 and/or the gate router 620 may be adapted to support wireless and/or wireline communication. The residential configurable security and surveillance system 602 may be adapted to provide security functions for a home and/or small commercial entities, for example. Moreover, new, additional, and/or upgraded features may be provided periodically and/or routinely by the SSFV 206 as a result of a commercial agreement.

In operation, the SSFV 206 may provide device programming files and/or decryption keys to configure the configurable security and surveillance system 602 via the TCP/IP network 204 and the network of at least one gate router 620 and at least one core router 618. The features provided by the device programming files may support access to the configurable security and surveillance system 602 via the mobile phone 604 and/or the PDA 606 to a user. The user may utilize the mobile phone 604 and/or the PDA 606 as an interface to control at least a portion of the operations and/or display at least a portion of the contents generated by the configurable security and surveillance system 602. In this regard, the user may utilize the network of at least one gate router 620 and at least one core router 618 to communicatively couple the wireless center 626 and the configurable security and surveillance system 602.

The configurable security and surveillance system 602 may be adapted to generate appropriate emergency signals and/or alarms to, for example, the school 608, the satellite link 610, the emergency agency 612, the police center 614, the commercial entity 624, and/or at least one home 616 in accordance with the features configured into the residential configurable security and surveillance system 602. For example, security breaches may be reported to any of these locations in accordance to the features supported by the residential configurable security and surveillance system 602. The types of security breaches and/or the locations to which the appropriate emergency signals are sent may depend on the security features received from the SSFV 206.

Figure 6B:
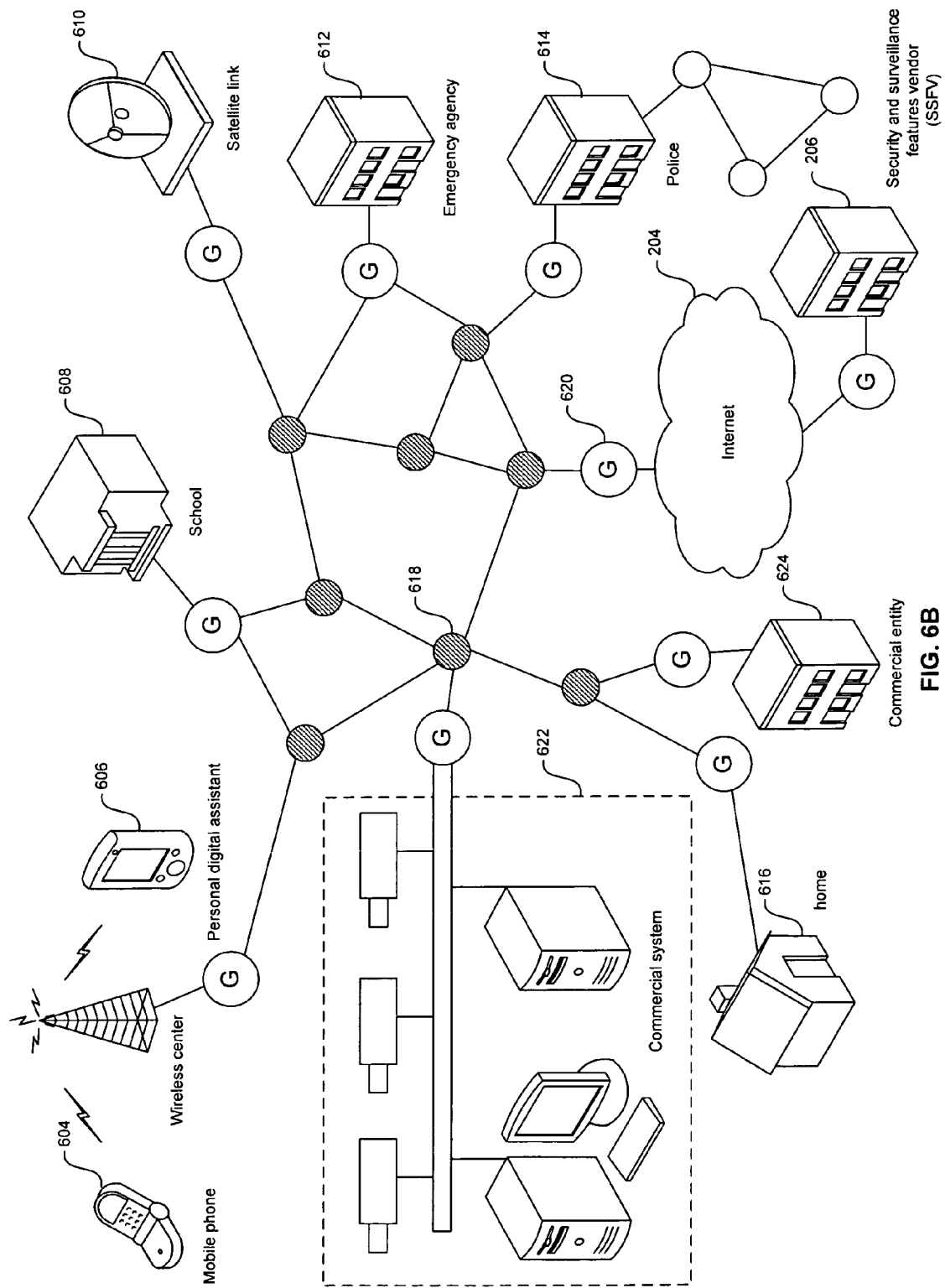
FIG. 6B illustrates an exemplary network comprising a commercial configurable security and surveillance system, in accordance with an embodiment of the invention.

FIG. 6B illustrates an exemplary network comprising a commercial configurable security and surveillance system, in accordance with an embodiment of the invention. Referring to FIG. 6B, there is shown a network 630 that differs from the network 600 in FIG. 6A in that a commercial configurable security and surveillance system 622 is utilized. The commercial configurable security and surveillance system 602 may be adapted to provide security functions for a large commercial entities and/or governmental entities, for example. In this regard, the commercial configurable security and surveillance system 622 may be adapted to support a large number and wide range of programmable sensor agents and programmable content analysis agents. Moreover, new, additional, and/or upgraded features may be provided periodically and/or routinely by the SSFV 206 as a result of a commercial agreement.

The approach described herein may result in more effectively and/or efficiently integrated security and surveillance systems. The use of configurable devices in the programmable sensor agents provides significant flexibility in the system architecture and may also increase the length of operation of a security and surveillance system before significant investments are required. In this regard, a user may determine the security functions and features necessary to their security operations while maintaining the ability to add and/or modify their security operations without having to replace significant portions of their existing hardware and/or software.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for configuring a security and/or surveillance system, the method comprising:
   receiving a device programming file in a programmable sensor agent of the security and/or surveillance system, said device programming file corresponding to at least one new feature selected for addition to or for upgrade of said programmable sensor agent;
   receiving at least one programming key corresponding to said device programming file;
   programming at least one configurable device in said programmable sensor agent to perform at least said selected at least one new feature, said programming based on said received device programming file, and wherein said new feature enables functionality in said programmable sensor agent not previously performed in said programmable sensor agent prior to said programming; and
   verifying said programming of said at least one configurable device in said programmable sensor agent.

2. The method according to claim 1, comprising decrypting said device programming file using said at least one programming key.

3. The method according to claim 1, wherein said programmable sensor agent is a surveillance video camera.

4. The method according to claim 1, comprising receiving said device programming file via a network transfer.

5. The method according to claim 1, comprising selecting said device programming file via a display interface in said programmable sensor agent.

6. The method according to claim 1, comprising storing at least a portion of said received device programming file in said programmable sensor agent.

7. The method according to claim 1, comprising programming said at least one configurable device via a processor.

8. The method according to claim 7, comprising programming said at least one configurable device via a Joint Test Action Group (JTAG) interface in said processor.

9. The method according to claim 7, comprising verifying said programming of said at least one configurable device via a Joint Test Action Group (JTAG) interface in said processor.

10. A non-transitory machine-readable media having stored thereon, a computer program having at least one code for configuring a security and/or surveillance system, the at least one code section being executable by a machine for causing the machine to perform steps comprising:

receiving a device programming file in a programmable sensor agent of the security and/or surveillance system, said device programming file corresponding to at least one new feature selected for addition to or for upgrade of said programmable sensor agent;

receiving at least one programming key corresponding to said device programming file;

programming at least one configurable device in said programmable sensor agent to perform at least said selected at least one new feature, said programming based on said received device programming file, and wherein said new feature enables functionality in said programmable sensor agent not previously performed in said programmable sensor agent prior to said programming; and verifying said programming of said at least one configurable device in said programmable sensor agent.

11. The machine-readable media according to claim 10, comprising code for decrypting said device programming file using said at least one programming key.

12. The machine-readable media according to claim 10, wherein said programmable sensor agent is a surveillance video camera.

13. The machine-readable media according to claim 10, comprising code for receiving said device programming file via a network transfer.

14. The machine-readable media according to claim 10, comprising code for selecting said device programming file via a display interface in said programmable sensor agent.

15. The machine-readable media according to claim 10, comprising code for storing at least a portion of said received device programming file in said programmable sensor agent.

16. The machine-readable media according to claim 10, comprising code for programming said at least one configurable device via a processor.

17. The machine-readable media according to claim 16, comprising code for programming said at least one configurable device via a Joint Test Action Group (JTAG) interface in said processor.

18. The machine-readable media according to claim 16, comprising code for verifying said programming of said at least one configurable device via a Joint Test Action Group (JTAG) interface in said processor.

19. A system for configuring a security and/or surveillance system, the system comprising:

a programmable sensor agent of the security and/or surveillance system, said programmable sensor agent comprises a network interface, a processor, an image processor, and an image sensor;

said image processor comprises at least one configurable device;

said network interface receives a device programming file, said device programming file corresponding to at least one new feature selected for addition to or for upgrade of said programmable sensor agent;

said network interface receives at least one programming key corresponding to said device programming file;

said processor programs at least a portion of said image processor to perform at least said selected at least one new feature, said programming based on said received device programming file, and wherein said new feature enables functionality in said programmable sensor agent not previously performed in said programmable sensor agent prior to said programming; and said processor verifies said programming of said at least a portion of said image processor.

20. The system according to claim 19, wherein said network interface decrypts said device programming file using said at least one programming key.

21. The system according to claim 19, wherein said network interface receives said device programming file via a network transfer from a system manager.

22. The system according to claim 19, wherein said programmable sensor agent comprises a backup battery.

23. The system according to claim 19, wherein said programmable sensor agent comprises a display interface.

24. The system according to claim 23, wherein said display interface selects said device programming file.

25. The system according to claim 19, wherein said programmable sensor agent comprises a memory.

26. The system according to claim 25, wherein said memory stores at least a portion of said received device programming file.

27. The system according to claim 19, wherein said processor programs said at least a portion of said image processor via a Joint Test Action Group (JTAG) interface.

28. The system according to claim 19, wherein said processor verifies said programming of said at least a portion of said image processor via a Joint Test Action Group (JTAG) interface.

29. The system according to claim 19, wherein said programmable sensor agent is a surveillance video camera.

* * * * *